F. BAUER.
LIQUID COOLING APPARATUS.
APPLICATION FILED OCT. 23, 1908.
927,765.
Patented July 13, 1909.
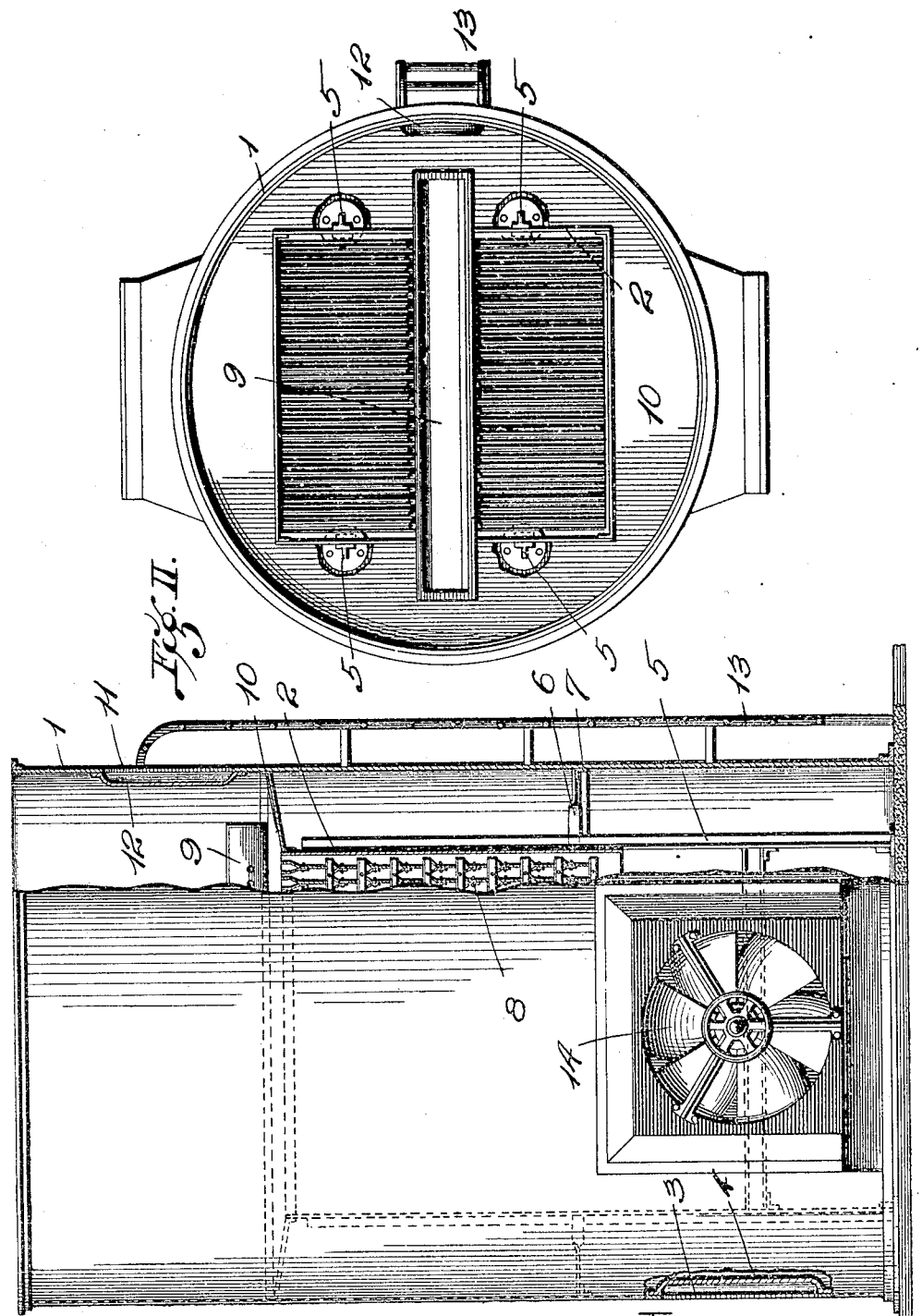

UNITED STATES PATENT OFFICE.

FERDINAND BAUER, OF ST. LOUIS, MISSOURI.

LIQUID-COOLING APPARATUS.

No. 927,765.  Specification of Letters Patent.  Patented July 13, 1909.

Application filed October 23, 1908. Serial No. 459,131.

*To all whom it may concern:*

Be it known that I, FERDINAND BAUER, a citizen of the United States of America, residing in the city of St. Louis and State of Missouri, have invented certain new and useful Improvements in Liquid-Cooling Apparatus, of which the following is a full, clear, and exact description, reference being had to the accompanying drawings, forming part of this specification.

My invention relates to that character of apparatus used for cooling liquids such as water and which comprises a shaft through which the liquid descends in contact with an ascending current of air. It is a well-known fact that apparatuses of this description, commonly termed "cooling towers", become so impaired after a few years' use as to be unfit for further service, this result being occasioned by the action of the elements upon the apparatuses and from which elements it has been hitherto found impossible to protect the apparatuses, due to the fact that inasmuch as water is constantly present in the apparatuses during the use thereof, there is no opportunity to apply paints or other preservatives to the interior surfaces of the apparatuses.

My invention has for its object the production of a liquid cooling apparatus comprising an outer and an inner casing of which the outer one serves as a protector for the inner one, within which the liquid distributing elements are located, and between which casings there is sufficient space to permit access to both the exterior and interior faces of the outer casing and the exterior face of the inner casing, in order that preservatives may be applied to said faces from time to time for the purpose of greatly increasing the durability of the apparatuses in which the casings are employed.

Figure I is in part an elevation and in part a vertical section of my liquid cooling apparatus. Fig. II is a top or plan view of the apparatus.

In the accompanying drawings: 1 designates the outer casing of my apparatus which is open at its upper end and seated upon a suitable foundation. 2 is the inner casing located within the outer casing and sufficiently separated therefrom to provide a space of sufficient dimension to permit of the movement of a painter or other workman throughout the space to apply a preservative to the inner face of the outer casing and to the exterior face of the inner casing. Access to this space may be gained through a suitable doorway 3 that is normally closed by a door 4.

The inner casing 2 is preferably supported by posts or uprights 5 that rest upon the foundation at the bottom of the cooling apparatus and which are braced by stays 6 arranged at intervals around the inner casing and secured to the posts 2 and a rail 7 that is attached to the outer casing 1, see Fig. 1. Within the inner casing are the water distributing members 8 that may be of any preferred construction and upon which the water descends as it is discharged from the receiving trough 9 into which the water to be cooled is delivered.

10 designates a platform that is interposed between the outer and inner casings and secured thereto at the upper end of the inner casing in such manner as to provide air tight joints between the platform and the casings. This platform is preferably inclined downwardly and inwardly from the outer casing and the inner casing in order that liquid falling thereon may be shed by the platform to the interior of the inner casing. Access to the interior of the outer casing above the platform is provided for by a doorway 11 in the outer casing which is normally closed by a door 12 and through which workmen may pass to enter the outer casing and stand upon the platform while engaged in applying a preservative coating to the interior of the outer casing at its upper end, or while accomplishing any repairs needed within the upper portion of the apparatus. A ladder 13 is preferably attached to the outer casing and leads to the doorway 11. Air may be delivered into the apparatus by one or more suitable fans 14.

The outer and inner casings of the herein described liquid cooling apparatus may be of any desired shape. As illustrated, the outer casing is of cylindrical shape, while the inner casing is of rectangular shape, but it is obvious that both of the casings may be cylindrical or rectangular, or other suitable shapes without departing from my invention.

I claim:

In a liquid cooling apparatus, an outer closed weatherproof casing, an inner casing within said outer casing and spaced apart therefrom, a platform uniting said casings at the upper end of the inner casing and closing the space between the casings, and liquid distributing means within said inner casing, substantially as set forth.

FERDINAND BAUER.

In the presence of—
  HOWARD G. COOK,
  EDNA LINN.